United States Patent
Manabe et al.

(10) Patent No.: US 10,386,794 B2
(45) Date of Patent: Aug. 20, 2019

(54) CONTROL DEVICE, STORAGE MEDIUM, AND CONTROL SYSTEM BY CREATING INTERNAL MODEL OF CONTROL TARGET

(71) Applicant: OMRON Corporation, Kyoto (JP)

(72) Inventors: Mikiko Manabe, Takatsuki (JP); Masaki Namie, Takatsuki (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/869,078

(22) Filed: Jan. 12, 2018

(65) Prior Publication Data

US 2018/0267486 A1    Sep. 20, 2018

(30) Foreign Application Priority Data

Mar. 14, 2017 (JP) ................. 2017-048117

(51) Int. Cl.
| | | |
|---|---|---|
| *G11B 13/02* | (2006.01) | |
| *G05B 13/02* | (2006.01) | |
| *G05B 13/04* | (2006.01) | |
| *G05B 17/02* | (2006.01) | |
| *G05B 19/05* | (2006.01) | |

(52) U.S. Cl.
CPC ......... *G05B 13/024* (2013.01); *G05B 13/048* (2013.01); *G05B 17/02* (2013.01); *G05B 13/041* (2013.01); *G05B 19/054* (2013.01)

(58) Field of Classification Search
None
See application file for complete search history.

(56) References Cited

U.S. PATENT DOCUMENTS

| | | | |
|---|---|---|---|
| 2004/0230325 A1 | 11/2004 | Ramamoorthy et al. | |
| 2007/0035870 A1* | 2/2007 | Chang | G11B 5/59644 360/75 |
| 2009/0021205 A1* | 1/2009 | Cullen | G05B 17/02 318/561 |
| 2010/0036510 A1 | 2/2010 | Cullen | |

(Continued)

FOREIGN PATENT DOCUMENTS

| | | | |
|---|---|---|---|
| EP | 3379349 A1 * | 9/2018 | G05B 17/02 |
| WO | 2011136160 | 11/2011 | |

(Continued)

OTHER PUBLICATIONS

"Search Report of Europe Counterpart Application", dated Aug. 29, 2018, p. 1-p. 8.

*Primary Examiner* — Tan X Dinh
(74) *Attorney, Agent, or Firm* — JCIPRNET

(57) ABSTRACT

A control device includes an interface for exchanging data with a servo driver. The servo driver is configured to execute a control arithmetic operation in which a manipulation amount for driving the servo motor is determined on the basis of a control parameter determined in accordance with a control target. The control device includes a creation unit that acquires the control parameter of the servo driver and creates an internal model representing a motion characteristic of the control target, and a target value calculation unit that calculates a corrected target value to be supplied to the servo driver on the basis of a target value corresponding to a target track and a feedback value from the control target.

20 Claims, 10 Drawing Sheets

(56) References Cited

U.S. PATENT DOCUMENTS

| | | | | |
|---|---|---|---|---|
| 2010/0125430 A1* | 5/2010 | Kanazawa | ......... | G01D 5/24452 |
| | | | | 702/96 |
| 2013/0002185 A1* | 1/2013 | Hosomi | ............... | G05B 19/416 |
| | | | | 318/625 |
| 2013/0035914 A1* | 2/2013 | Igarashi | ............... | G05B 13/041 |
| | | | | 703/2 |
| 2014/0306641 A1* | 10/2014 | Igarashi | ................ | G05B 17/02 |
| | | | | 318/561 |
| 2017/0153614 A1* | 6/2017 | Namie | ............... | G05B 13/0265 |

FOREIGN PATENT DOCUMENTS

| | | |
|---|---|---|
| WO | 2013077007 | 5/2013 |
| WO | 2016018704 | 2/2016 |

\* cited by examiner

CONTROL DEVICE, STORAGE MEDIUM, AND CONTROL SYSTEM BY CREATING INTERNAL MODEL OF CONTROL TARGET

CROSS-REFERENCE TO RELATED APPLICATION

This application claims the priority benefit of Japanese application serial no. 2017-048117, filed on Mar. 14, 2017. The entirety of the above-mentioned patent application is hereby incorporated by reference herein and made a part of this specification.

BACKGROUND

Technical Field

The invention relates to a technique for improving control performance of a control system that uses a servo driver.

Description of Related Art

Various techniques for performing position control, speed control, and the like of a control target by supplying a target value to a servo driver that drives a servo motor are known. One of the known techniques for improving control performance of position control and speed control is obtaining a model representing characteristics of servo drivers and a control target in advance and then using the acquired model to perform correction of a target value or the like.

For example, International Publication No. 2011/136160 (Patent Document 1) discloses a servo control device that can follow a control target at a high speed with high accuracy without causing saturation of control input or saturation of a change rate with respect to an arbitrary target value. This servo control device includes a reference model unit that generates model input and model output with input of a target value, and a feedback control unit that generates feedback input so that control output of a control target follows the model output.

International Publication No. 2013/077007 (Patent Document 2) discloses a motor control device which uses a past target value as well as a current target value to cause a motor to follow a target value at a high speed with high accuracy and not to excite vibration thereof when the motor stops while satisfying constraints on control input or an amount of change in control input according to arbitrary position commands. The motor control device includes a reference model unit that generates model output indicating a desired operation of a control target including a motor and model input that drives the control target in the desired operation on the basis of a target value that is supposed to reach control output of the control target, a feedback control unit that inputs the control output and model output and generates feedback input that causes the control output to follow the model output, and a model input adder that adds the model input and the feedback input and then generates control input for the control target.

[Patent Document 1] International Patent Publication No. 2011/136160
[Patent Document 2] International Patent Publication No. 2013/077007

Assume in actual application, there are many cases in which a configuration of a control device such as a programmable logic controller (PLC) supplying a target value to one or each of multiple servo drivers is employed. In such a configuration, the control device may employ a solution of improving control performance by generating each of target values for characteristics of a control target and giving the value to each of the servo drivers.

It is necessary to build characteristics of the servo driver and the control target viewed from the control device into a model to employ the above-described solution. However, such modeling requires a certain level of knowledge, and it is difficult for a user with poor knowledge to actually apply the solution.

The above-described Patent Document 1 and Patent Document 2 merely disclose a servo control device and a motor control device which correspond to a servo driver, and give no assumption with respect to a combination of a control device and the servo driver.

A technique in which the solution of improving control performance can be easily realized by calculating a target value to be supplied to each of the servo drivers in accordance with characteristics of the control target in a configuration in which one or multiple servo drivers are connected to the control device is desired.

SUMMARY

According to an aspect of the invention, a control device that controls a control target including a servo motor by supplying a target value to a servo driver that drives the servo motor is provided. The control device includes an interface for exchanging data with the servo driver. The servo driver is configured to execute a control arithmetic operation in which a manipulation amount for driving the servo motor is determined on the basis of a control parameter determined in accordance with the control target. The control device includes a creation unit that acquires the control parameter of the servo driver and creates an internal model representing a motion characteristic of the control target, and a target value calculation unit that calculates a corrected target value to be supplied to the servo driver on the basis of a target value corresponding to a target track and a feedback value from the control target.

According to another aspect of the invention, a control program executable by a control device that controls a control target including a servo motor by supplying a target value to a servo driver that drives the servo motor is provided. The servo driver is configured to execute a control arithmetic operation in which a manipulation amount for driving the servo motor is determined on the basis of a control parameter determined in accordance with the control target. The control program causes the control device to execute a step of acquiring the control parameter of the servo driver, a step of creating an internal model representing a motion characteristic of the control target, a step of acquiring a target value corresponding to a target track, and a step of calculating a corrected target value to be supplied to the servo driver on the basis of a feedback value from the control target.

According to still another aspect of the invention, a control system includes a servo driver that drives a servo motor as well as a control device that controls a control target including a servo motor by supplying a target value to the servo driver are provided. The servo driver is configured to execute a control arithmetic operation in which a manipulation amount for driving the servo motor is determined on the basis of a control parameter determined in accordance with the control target. The control device includes an interface for exchanging data with the servo driver, a creation unit that acquires the control parameter of the servo driver and creates an internal model representing a motion characteristic of the control target, and a target value calculation unit that calculates a corrected target value to be supplied to the servo driver on the basis of a target value corresponding to a target track and a feedback value from the control target.

DESCRIPTION OF THE EMBODIMENTS

Figure 1:
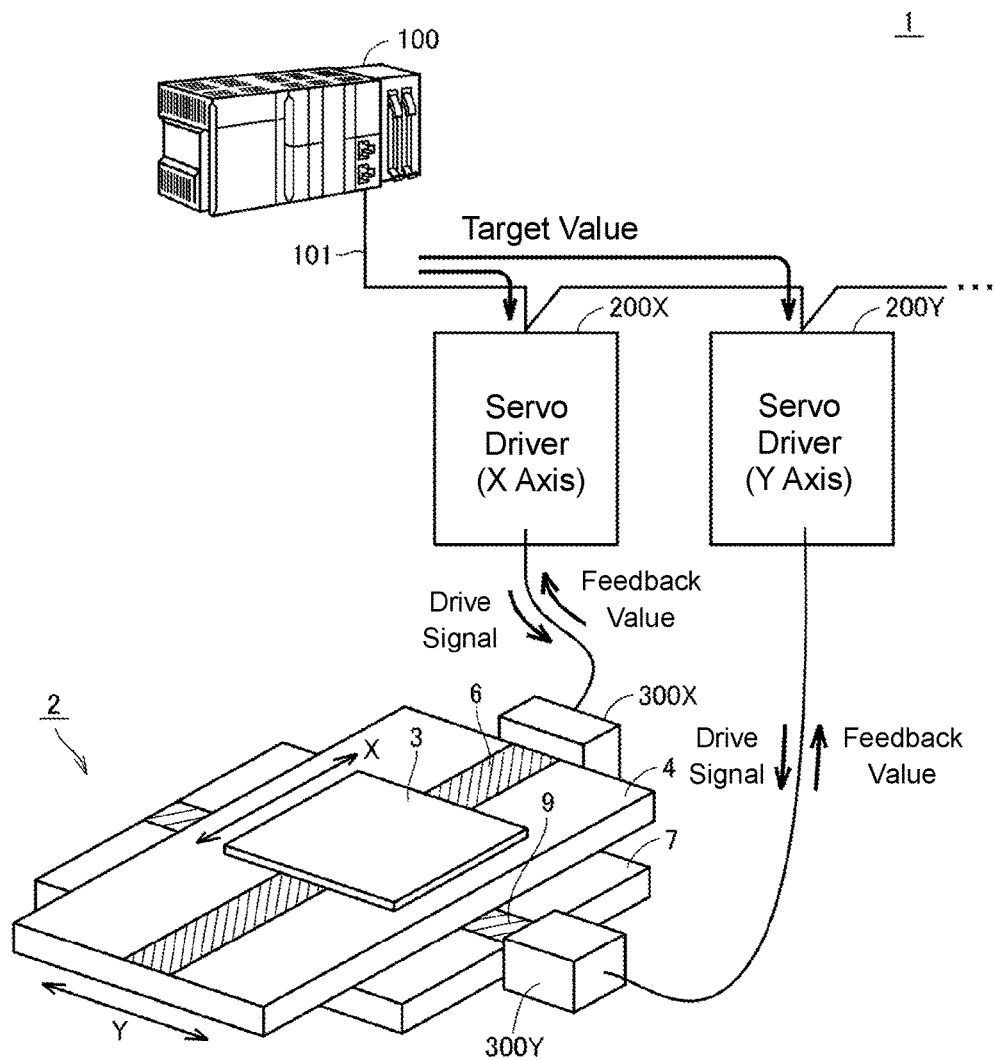
FIG. 1 is a schematic diagram showing an example of a configuration of a control system according to an embodiment of the invention.

According to an embodiment of the invention, the target value calculation unit calculates the corrected target value in accordance with model predictive control. According to an embodiment of the invention, the control device is connected to multiple servo drivers, and the creation unit and the target value calculation unit are configured to correspond to each of the multiple servo drivers.

According to an embodiment of the invention, the control device and the servo driver are connected for communication, and the creation unit acquires the control parameter by issuing a predetermined communication command to the servo driver.

According to an embodiment of the invention, the control device includes a processor that executes a user program, and the creation unit and the target value calculation unit are functionalized with a function block prescribed in the user program.

According to an embodiment of the invention, the control device further includes a storage unit that stores time series data of a target value that defines the target track.

According to an embodiment of the invention, the servo driver executes a control arithmetic operation in accordance with a control loop of a model-following control system.

According to an embodiment of the invention, the servo driver executes a control arithmetic operation in accordance with a control loop of a simple adaptive control system.

According to an embodiment of the invention, with respect to a configuration in which one or multiple servo drivers are connected to a control device, the solution of improving control performance can be easily realized by calculating a target value to be supplied to each servo driver in accordance with characteristics of a control target.

Embodiments of the invention will be described in detail with reference to the drawings. The same or equivalent parts in the drawings will be denoted by the same reference numerals, and descriptions thereof will not be repeated.

A. Example of Configuration of Control System

First, an example of a configuration of a control system 1 according to the present embodiment will be described. FIG. 1 is a schematic diagram showing an example of the configuration of the control system 1 according to the present embodiment. FIG. 1 shows an example in which an XY stage 2 is driven as a control target of the control system 1.

The control system 1 includes a control device 100 and one or multiple servo drives. In the configuration shown in FIG. 1, the control device 100 is connected to two servo drivers 200X and 200Y (hereinafter referred to collectively as "servo drivers 200"). The servo drivers 200 drive servo motors.

The control device 100 controls control targets including the servo motors by giving target values to one or multiple servo drivers 200. Data including the target values can be exchanged between the control device 100 and the one or multiple servo drivers 200.

FIG. 1 shows an example of a configuration in which the control device 100 is connected to the one or multiple servo drivers 200 via a field bus 101. However, the invention is not limited to the configuration example, and can employ an arbitrary communication unit. Alternatively, the control device 100 and the servo drivers 200 may be directly connected using signal lines. Furthermore, a configuration in which the control device 100 and the servo drivers 200 are integrated may be employed. The invention may employ any embodiment as long as an algorithm is implemented therein as will be described below.

The XY stage 2 is a mechanism which enables a work plate 3 on which workpieces are placed to move in two orthogonal directions.

More specifically, a first base plate 4 is provided with a ball screw 6 for arbitrarily moving the work plate 3 in an X direction. The ball screw 6 is engaged with a nut included in the work plate 3. When a servo motor 300X connected to one end of the ball screw 6 drives rotation, the nut included in the work plate 3 and the ball screw 6 are rotated relative to each other, and as a result, the work plate 3 is moved in the X direction.

In addition, a second base plate 7 is provided with a ball screw 9 for arbitrarily moving the work plate 3 and the first base plate 4 in a Y direction. The ball screw 9 is engaged with a nut included in the first base plate 4. A servo motor 300Y connected to one end of the ball screw 9 drives rotation so that the nut included in the first base plate 4 and the ball screw 9 are rotated relative to each other, and as a result, the work plate 3 and the first base plate 4 are moved in the Y direction.

The control device 100 supplies a target position in the X direction to the servo driver 200X as a target value and a target position in the Y direction to the servo driver 200Y as a target value in accordance with a previously specified target track. As the target positions of the X direction and the Y direction are sequentially updated, a track of the work plate 3 (and a workpiece disposed on the work plate 3, which is not shown in the drawing) on a two-dimensional plane (i.e., a coordinate position each time) can be arbitrarily controlled.

In the following description, the servo drivers 200 constituting the XY stage 2 and a load (machine) driven by the servo drivers 200 may be collectively referred to as a "mechanical system."

Each of the servo drivers 200 includes a controller 202 for performing an arithmetic operation related to a control loop, which will be described below, and a drive circuit 204 for supplying a drive signal to the servo motors 300 on the basis of the arithmetic operation result of the controller 202. As will be described below, the servo driver 200 receives a feedback value indicating a state of the XY stage 2 (i.e., a control amount of a position or the like).

In the present embodiment, a configuration example in which an output signal from an encoder combined with a rotation axis of each of the servo motors 300 is used as a feedback value is shown as an example. Positions, rotation phases, rotational speeds, cumulative numbers of rotations, and the like of the servo motors 300 can be detected using the output signal from the encoder. Note that feedback values from the servo motors 300 may be input directly to the control device 100.

B. Example of Configuration of Each Device Included in Control System

Next, examples of configurations of the control device 100 and the servo drivers 200 included in the control system 1 will be described.

(b1: Control Device 100)

As an example, the control device 100 according to the present embodiment may be implemented using a PLC. The control device 100 may realize processes, which will be described below, when a processor executes pre-stored control programs (including a system program and a user program that will be described below).

Figure 2:
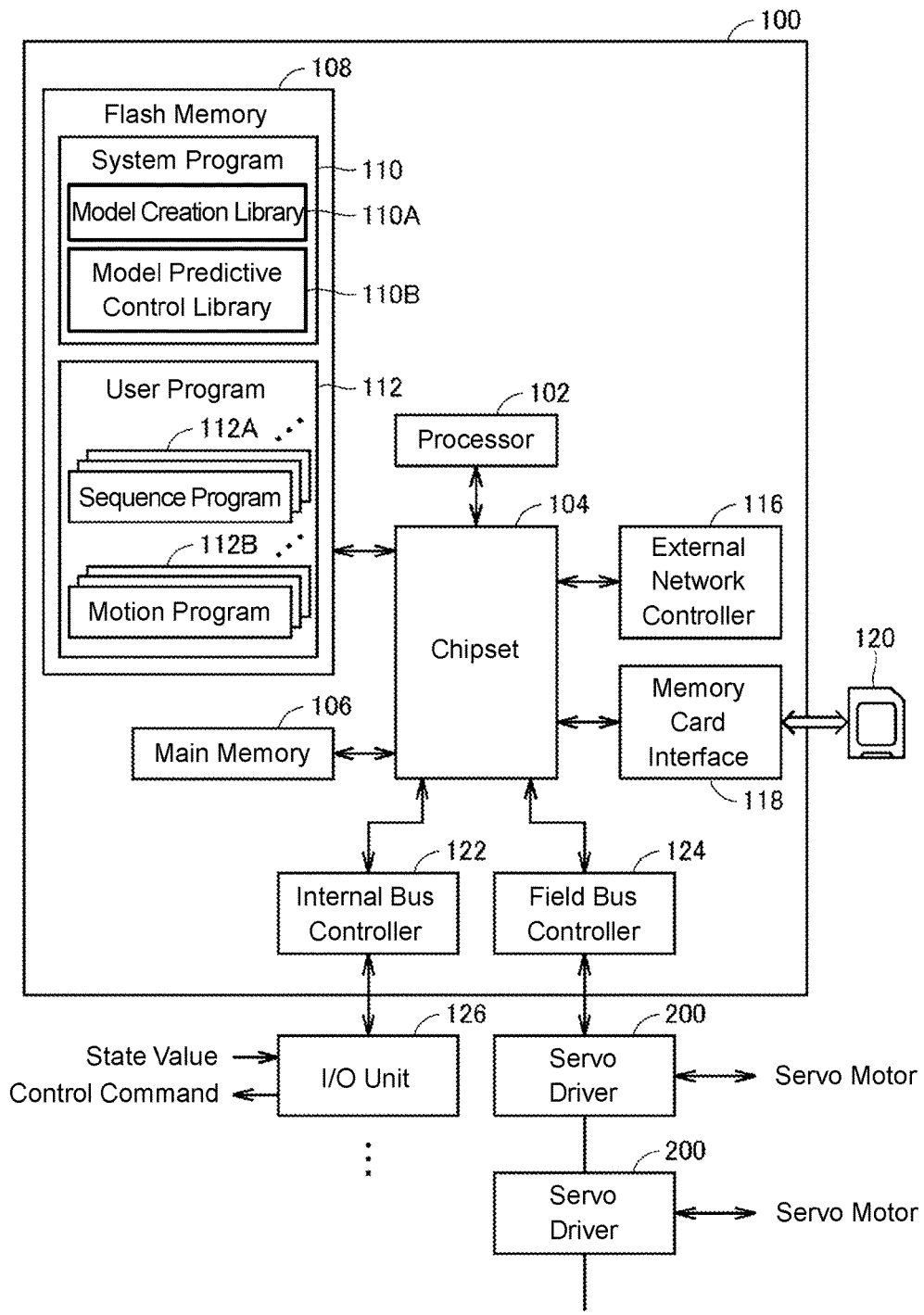
FIG. 2 is a schematic diagram showing an example of a hardware configuration of a control device according to the embodiment.

FIG. 2 is a schematic diagram showing an example of a hardware configuration of the control device 100 according to the present embodiment. Referring to FIG. 2, the control device 100 includes a processor 102 such as a central processing unit (CPU) and a micro-processing unit (MPU), a chip set 104, a main memory 106, a flash memory 108, an external network controller 116, a memory card interface 118, an internal bus controller 122, and a field bus controller 124.

The processor 102 reads a system program 110 and a user program 112 stored in the flash memory 108 and develops and executes the programs in the main memory 106 to realize arbitrary control over a control target. The processor 102 executes output of target values to the servo drivers, the acquisition of feedback values from the servo drivers, processes related to data communication via the field bus, and the like, which will be described below, by executing the system program 110 and the user program 112.

The system program 110 includes command codes for providing basic functions of the control device 100, such as data input/output processing and execution timing control. The system program 110 includes a model creation library 110A and a model prediction control library 110 B in its part. These libraries are kinds of program module and include command codes for realizing processing and functions according to the present embodiment. The user program 112 is arbitrarily designed in accordance with a control target and includes a sequence program 112A for executing the sequence control and a motion program 112E for executing motion control. The user program 112 realizes the processing and functions according to the present embodiment by defining a model creation function block and a model prediction control function block that use the model creation library 110A and the model predictive control library 110B. The function blocks are components of programs executed by the control device 100, and refer to blocks created by modularizing program elements that are used multiple times.

The chip set 104 realizes the entirety of processing of the control device 100 by controlling each component.

The internal bus controller 122 is an interface for exchanging data with various devices connected to the control device 100 via an internal bus. As an example of such a device, an I/O unit 126 is connected thereto.

The field bus controller 124 is an interface for exchanging data with various devices connected to the control device 100 via a field bus. The servo drivers 200 are connected to the control device 100 as an example of such a device.

The internal bus controller 122 and the field bus controller 124 can give an arbitrary command to a device connected thereto, and can acquire arbitrary data (including a measurement value) managed by the device. In addition, the internal bus controller 122 and/or the field bus controller 124 also function as interfaces for exchanging data with the servo drivers 200.

The external network controller 116 controls exchange of data using various kinds of wired/wireless networks. The memory card interface 118 is configured such that a memory card 120 can be detached therefrom, and can write and read data in and from the memory card 120.

(b2: Servo Driver 200)

Figure 3:
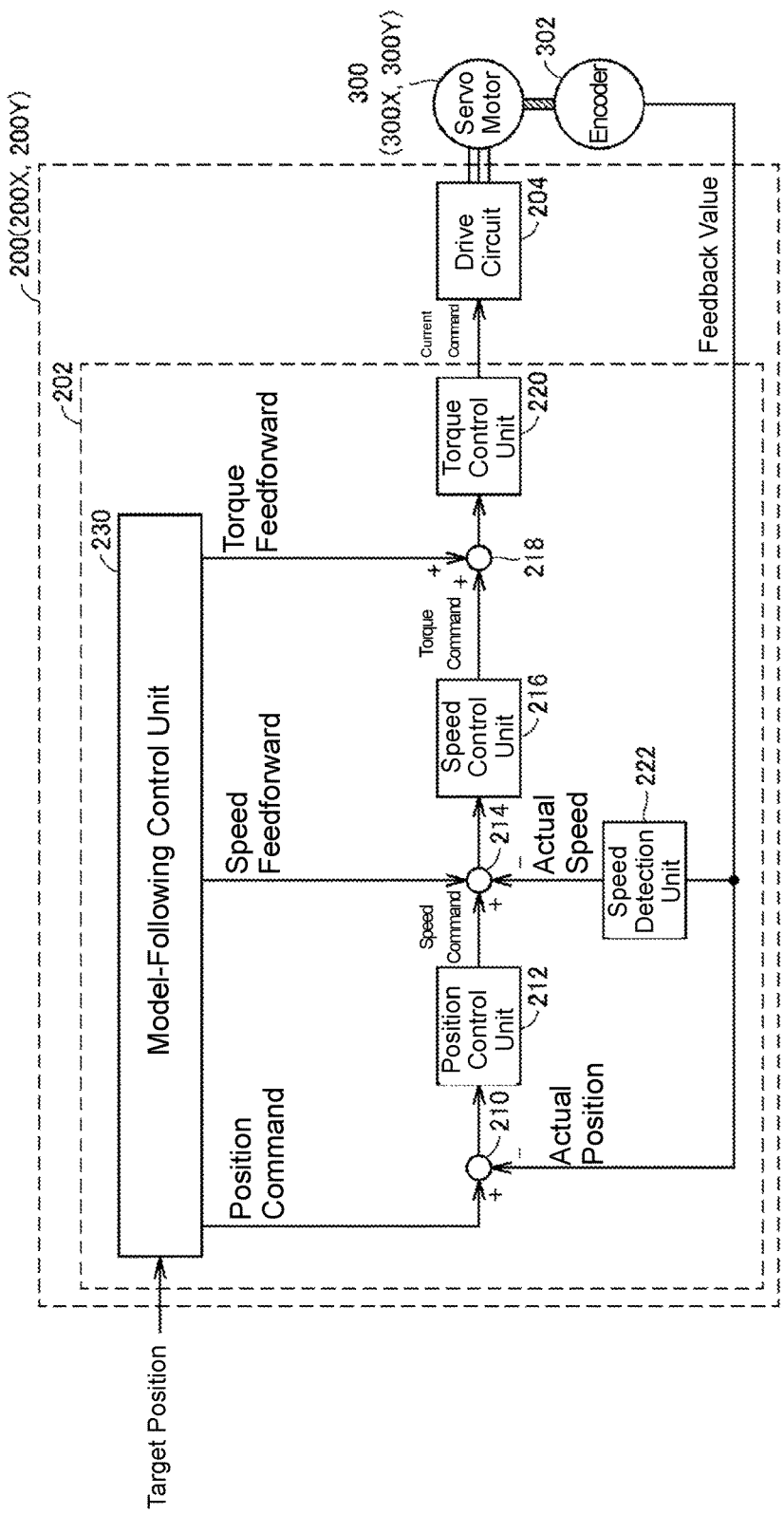
FIG. 3 is a schematic diagram showing an example of a functional configuration of a servo driver connected to the control device according to the embodiment.

A functional configuration of the servo drivers 200 connected to the control device 100 according to the present embodiment will be described. FIG. 3 is a schematic diagram showing an example of the functional configuration of the servo driver 200 connected to the control device 100 according to the embodiment.

In the control system 1 according to the present embodiment, a target position is served as a target value from the control device 100 to the servo driver 200, and an output signal from an encoder 302 combined with the servo motor 300 is served as a feedback value.

The servo driver 200 included in the control system 1 according to the present embodiment adjusts a current command, which is a manipulation amount, for the drive circuit 204 so that an actual position obtained from the feedback value from the encoder 302 follows the target position supplied by the control device 100 or the like. As an example, the servo driver 200 according to the present embodiment is configured a control loop of a model-following control system. That is, in the servo driver 200, a control arithmetic operation is executed in accordance with the control loop of the model-following control system.

A control parameter such as control gain set for the control loop is optimized in advance in accordance with a control target. That is, the servo driver 200 is configured to execute a control arithmetic operation to determine the manipulation amount for driving the servo motor 300 on the basis of the control parameter determined in accordance with the control target. Specifically, the control arithmetic operation executed by the controller 202 of the servo driver 200 includes a speed control loop as a minor loop as well as a position control loop as a main loop.

More specifically, the controller 202 of the servo driver 200 includes difference calculation units 210 and 214, a position control unit 212, a speed control unit 216, an adder 218, a torque control unit 220, a speed detection unit 222, and a model-following control unit 230 as a functional configuration.

The position control unit 212 is a control arithmetic operation unit configured as the position control loop and outputs a speed command in accordance with a position deviation from the difference calculation unit 210 as a manipulation amount. The difference calculation unit 210 calculates a deviation between a position command from the model-following control unit 230 and the actual position (a feedback value).

The speed control unit 216 is a control arithmetic operation unit configured as the speed control loop, and outputs a torque command in accordance with a speed deviation from the difference calculation unit 214 as a manipulation amount. The difference calculation unit 214 calculates a deviation between the manipulation amount (a speed command) from the position control unit 212 and an actual speed (a feedback value).

The speed detection unit 222 detects an actual speed (or an actual rotation rate) of the servo motor 300 using a feedback value (e.g., the number of pulses, which is proportional to the number of rotations of the servo motor 300) from the encoder 302.

The torque control unit 220 is a control arithmetic operation unit configured as a torque control loop and outputs a current command in accordance with the manipulation amount (torque command) from the speed detection unit 222 as a manipulation amount.

The drive circuit 204 adjusts a level, a timing, a waveform, and the like of a current to be supplied to the servo motor 300 to realize the manipulation amount (current command) from the torque control unit 220.

The model-following control unit 230 acquires characteristic parameters indicating motion characteristics of control targets (the servo drivers 200 and a load (machine) driven by the servo drivers 200) in advance through tuning. The model-following control unit 230 calculates a position command, which is a target value in the position control loop, speed feed-forward of the speed control loop, and torque feed-forward of the torque control loop, with respect to a target position supplied from the control device 100 or the like on the basis of the characteristic parameters.

C. Overview

Next, an overview of the processing and functions according to the present embodiment will be described.

Tuning for deciding control gain of each control unit is executed in advance in order to appropriately control a control target using the model-following control system as shown in FIG. 3. That is, the servo driver 200 has a function of executing tuning for deciding a control parameter such as the control gain. Control parameters, such as the control gain, that are necessary for the configuration of the model-following control system of the servo drivers 200 will also be collectively referred to as "servo parameters" in the following description.

As a technique of tuning for deciding a servo parameter, a known method such as a step response method or a limit sensitivity method can be employed.

Motion characteristics of control targets (a mechanical system and the servo drivers) are reflected in a servo parameter obtained through such tuning. That is, servo parameters held by the servo drivers 200 are information indicting the motion characteristics of the control targets, and such information is also used to control the control device 100 in the present embodiment.

Figure 4:
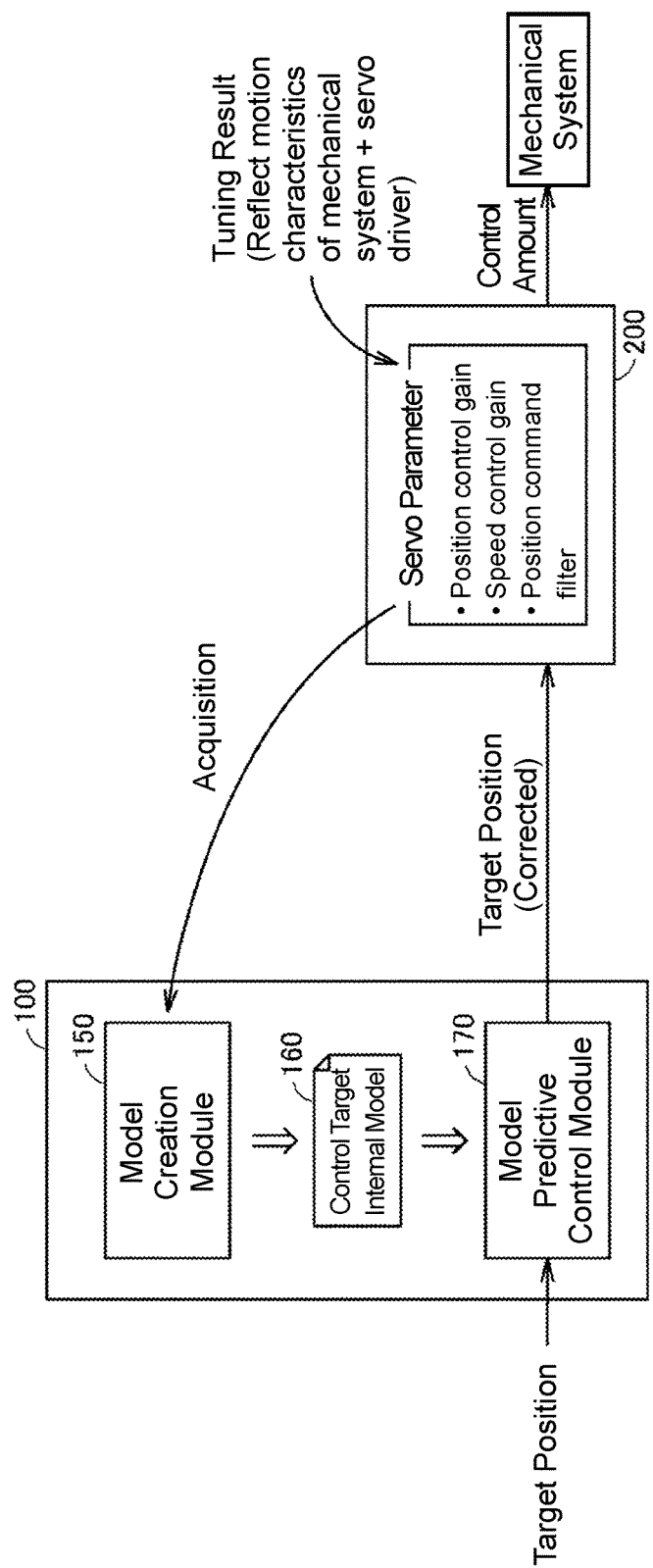
FIG. 4 is a schematic diagram for describing an overview of processing and functions according to the embodiment.

FIG. 4 is a schematic diagram for describing an overview of the processing and functions according to the present embodiment. Referring to FIG. 4, the control device 100 includes a model creation module 150 and a model predictive control module 170 as a main functional configuration. These modules are typically implemented by prescribing the model creation function block and the model predictive control function block in the user program 112 and calling each of the model creation library 110A and model predictive control library 110B. That is, the model creation module 150 and the model predictive control module 170 are functionalized by the function blocks prescribed in the user program 112.

The model creation module 150 acquires control parameters (servo parameters) of the servo drivers 200 and creates an internal model 160 representing motion characteristics of control targets viewed from the control device 100.

Then, in a stage in which actual control over a control target is executed, model predictive control is performed using the created internal model 160. That is, the model predictive control module 170 calculates a corrected target position (corrected target value) to be supplied to the servo drivers 200 on the basis of a target value corresponding to a target track and an actual position (feedback value) from the control target. That is, the model predictive control module 170 calculates the corrected target value in accordance with the model predictive control.

More specifically, the model predictive control module 170 acquires a target position of each time from a target track indicating a track on which the control target is to be moved. The model predictive control module 170 corrects the original target position on the basis of the internal model 160 so that the servo drivers 200 output control amounts in accordance with the motion characteristics of the control target, and then supplies corrected target positions to the servo drivers 200 as target values. In the model predictive control executed by the model predictive control module 170, target positions are corrected so that a future manipulation amount (actual position) calculated from the internal model coincides with a future target value (commanded value), and a corrected target position is calculated. As described above, by adjusting the target value supplied from the control device 100 to the servo drivers 200 in accordance with the motion characteristics of the control target, a control system with traceability can be realized.

In addition, since the internal mode indicating the motion characteristics of the control target necessary for realizing the model predictive control of the control device 100 can be automatically created from existing information, the model predictive control can be used even when a user has no knowledge about model creation.

D. Procedure

Figure 5:
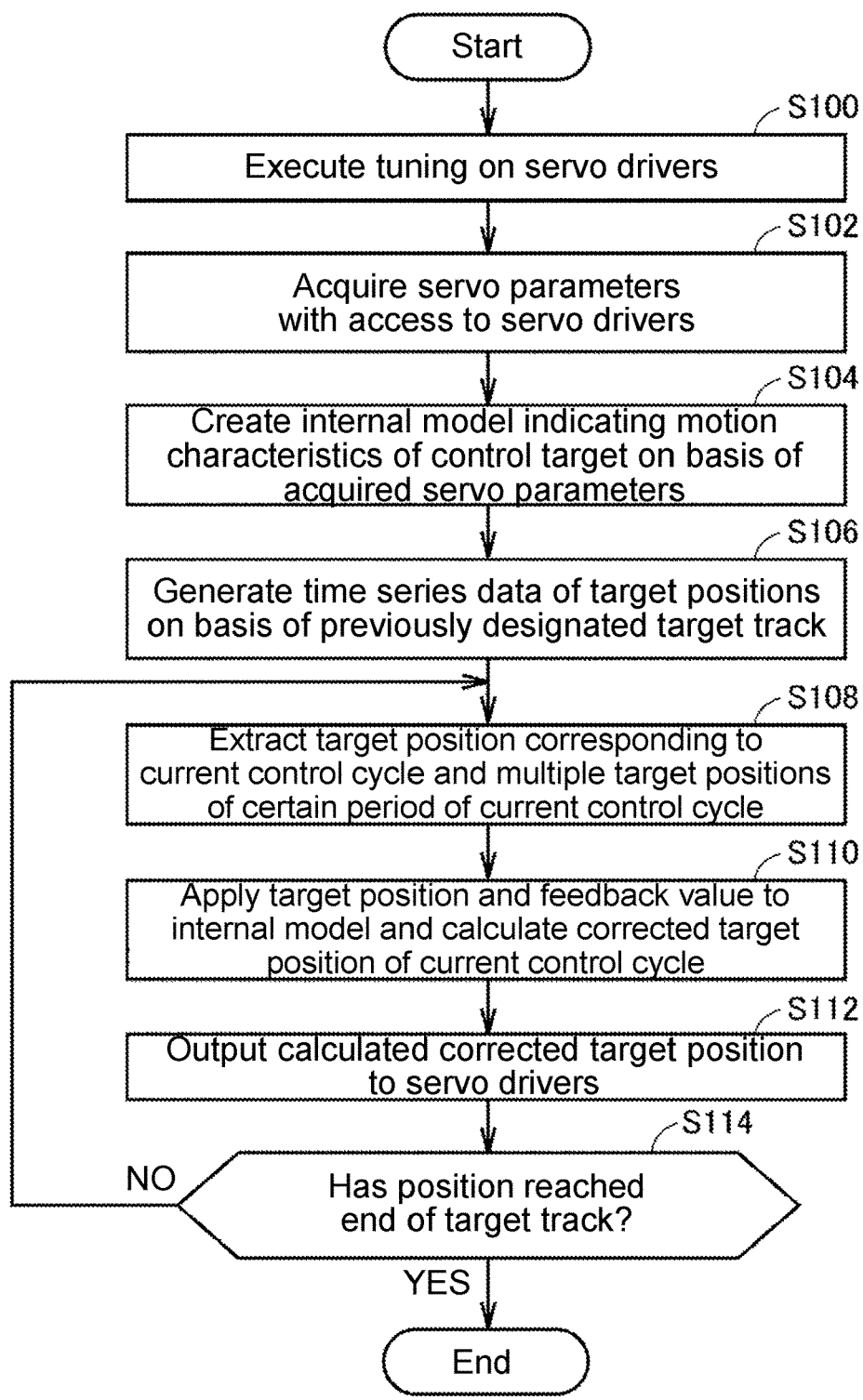
FIG. 5 is a flowchart showing a procedure to be performed in the control system according to the embodiment.

Next, an overview of a procedure to be performed in the control system 1 according to the present embodiment will be described. FIG. 5 is a flowchart showing the procedure to be performed in the control system 1 according to the present embodiment. Steps taken by the control device 100 among the steps shown in FIG. 5 may be realized by the processor 102 of the control device 100 executing control programs (including the system program 110 and the user program 112 shown in FIG. 2).

Referring to FIG. 5, the servo drivers 200 execute tuning for determining servo parameters (Step S100) when a user operation is received. The servo parameters determined in the tuning are stored in the servo drivers 200.

The control device 100 accesses the servo drivers 200 and acquires the servo parameters (Step S102). Then, the control device 100 creates the internal model 160 representing motion characteristics of a control target on the basis of the acquired servo parameters (Step S104).

The control device 100 generates time series data of target positions on the basis of a previously designed target track (Step S106). That is, time series data indicating target positions of a control cycle defining the target track is generated. Note that the time series data of the target positions may be previously stored. That is, the control device 100 stores the time series data of the target values defining the target track. In this case, the process of Step S106 refers to accessing the pre-stored time series data of the target positions.

The target positions of the control cycle defining the target track may be pre-stored in the form of time series data, as described above, or target values of the control cycle may be sequentially calculated using a pre-determined calculation formula.

The control device 100 extracts a target position corresponding to the current control cycle and multiple target positions of a certain period of the current control cycle from the time series data of the target positions generated in Step S106 (Step S108). That is, the control device 100 acquires target values corresponding to the target track.

The control device 100 applies the extracted target positions and a feedback value (actual position) to the internal model 160 created in Step S104 and calculates a corrected target position of the current control cycle (Step S110). That is, the control device 100 calculates the corrected target value to be supplied to the servo drivers 200 on the basis of the target position and the feedback value from the control target. Finally, the control device 100 outputs the calculated corrected target position to the servo drivers 200 (Step S112).

Next, the control device 100 determines whether a position has reached an end of the target track (Step S114). When the position has not reached the end of the target track (NO in Step S114), the processes from Step S108 are repeated.

When the position has reached the end of the target track (YES in Step S114), the model predictive control ends.

The model predictive control according to the present embodiment is realized through the above-described procedure. Note that the processes of Steps S108 to S114 are executed by each designated servo driver 200. Thus, processes of Steps S108 to S114 for each of the multiple servo drivers 200 are executed in parallel.

E. Functional Configuration

Next, a functional configuration of the control device 100 for realizing the model predictive control according to the present embodiment will be described.

Figure 6:
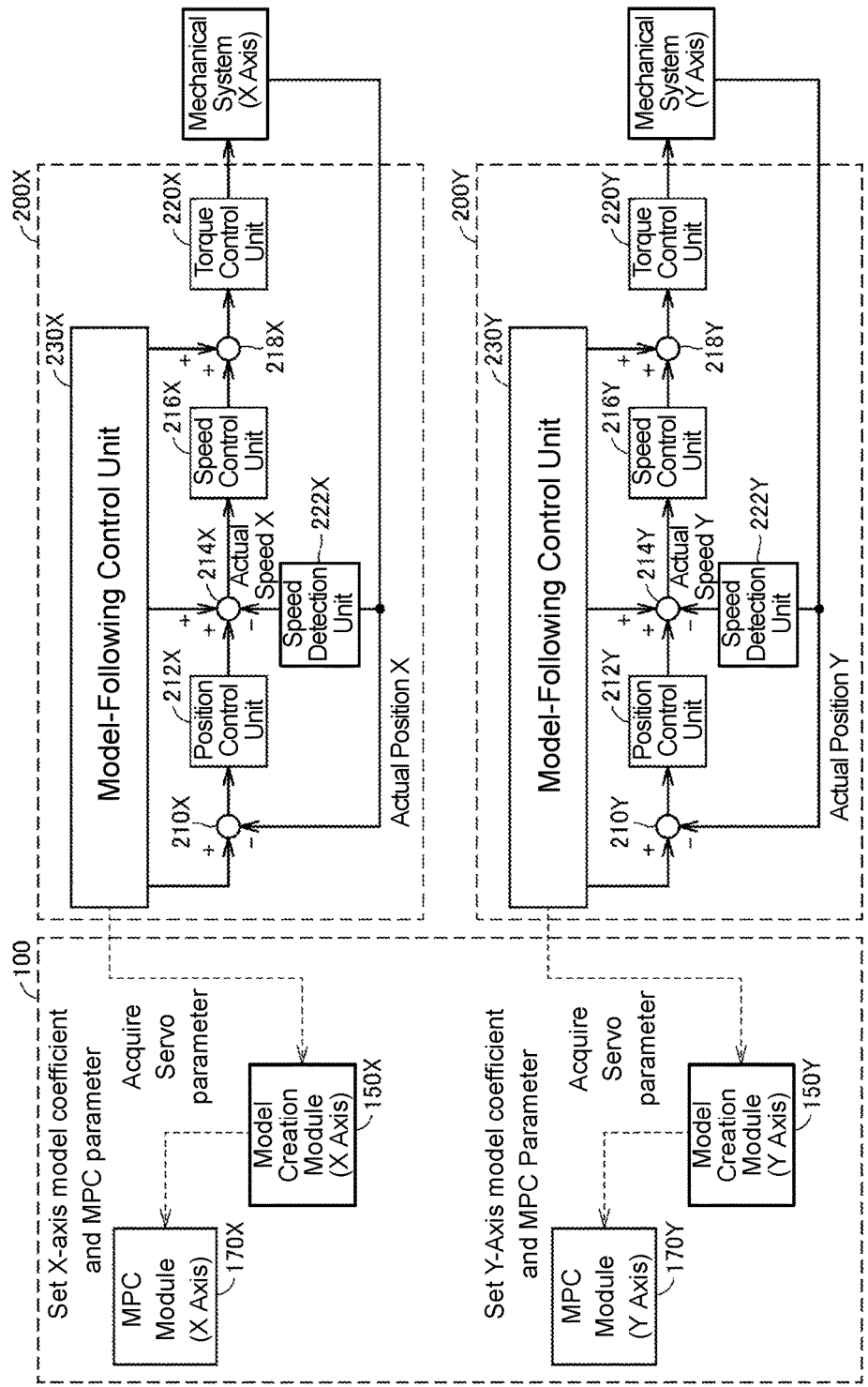
FIG. 6 is a schematic diagram showing a functional configuration applied when an internal model of a control target is created by the control device according to the embodiment.
Figure 7:
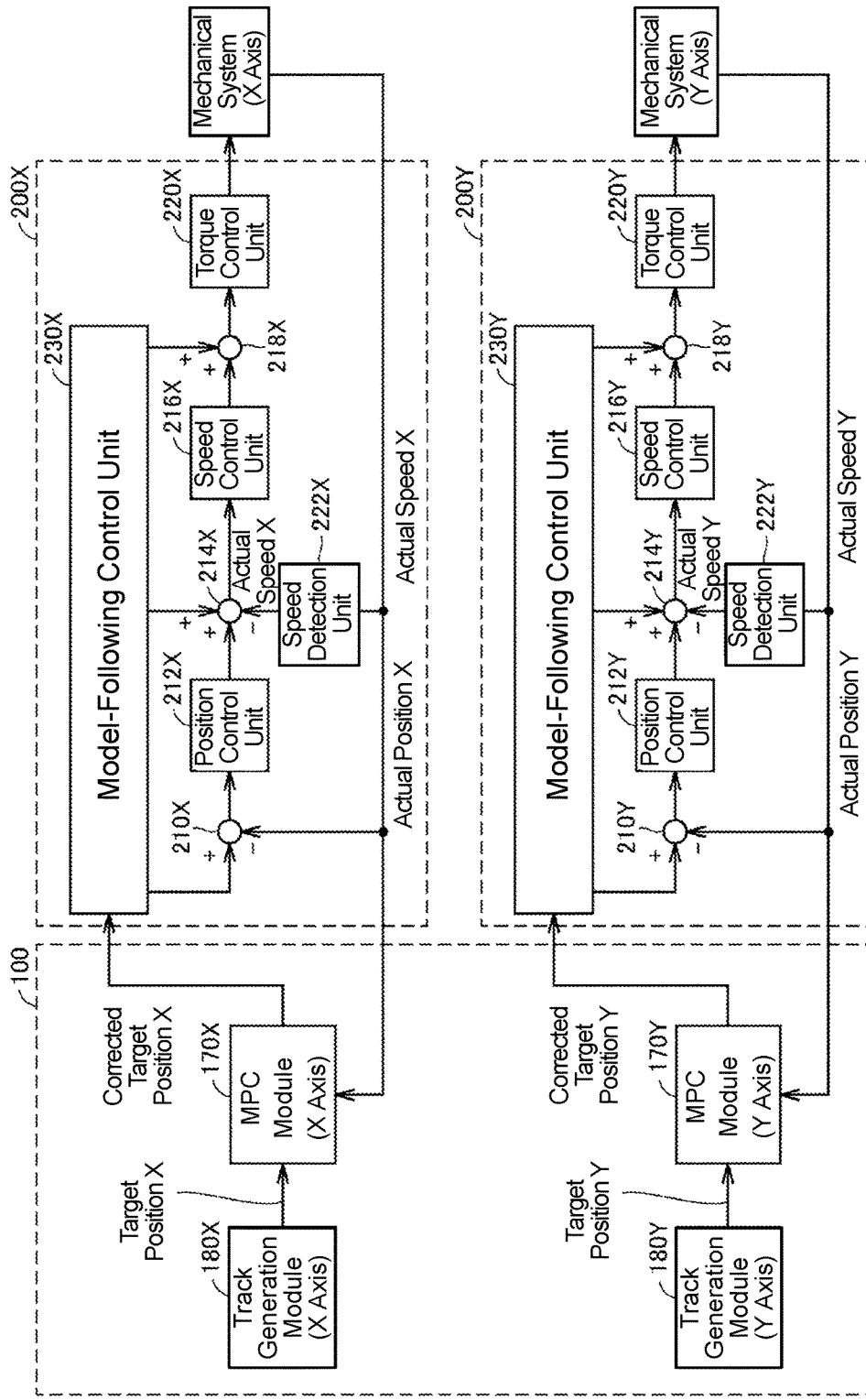
FIG. 7 is a schematic diagram showing a functional configuration applied when model predictive control using the internal model of the control target is executed by the control device according to the embodiment.

FIG. 6 is a schematic diagram showing a functional configuration applied when the internal model 160 of the control target is created by the control device 100 according to the present embodiment. FIG. 7 is a schematic diagram showing a functional configuration applied when the model predictive control using the internal model 160 of the control target is executed by the control device 100 according to the present embodiment.

FIG. 6 and FIG. 7 show an example in which the control device 100 drives the XY stage 2 (see FIG. 1). That is, a configuration example in which the two servo drivers 200X and 200Y for an X axis and a Y axis are connected to the control device 100 is shown. Thus, the control device 100 according to the present embodiment implements two sets of similar function modules each corresponding to the servo drivers 200X and 200Y. The configurations shown in FIG. 6 and FIG. 7 are merely examples, and the number of servo drivers 200 may be one or three or more.

When multiple servo drivers 200 are connected to the control device 100, as shown in FIG. 6 and FIG. 7, the model creation module 150 and the model predictive control module 170 are set to be associated each of with the servo drivers 200.

More specifically, referring to FIG. 6 and FIG. 7, the control device 100 includes model creation modules 150X and 150Y, model predictive control modules 170X and 170Y, and track generation modules 180X and 180Y as a main functional configuration. The model predictive control will be denoted by "MPC" in the drawings.

As described above, the model creation modules 150X and 150Y are implemented by defining the model creation function block in association with each of the X axis and the Y axis in the user program 112. Similarly, the model predictive control modules 170X and 170Y are implemented by defining the model predictive control function block in association with each of the X axis and the Y axis in the user program 112.

As shown in FIG. 6, in the creation process of the internal model 160 of the control target, the model creation module 150X acquires a servo parameter from the servo driver 200X corresponding thereto. In addition, the model creation module 150Y acquires another servo parameter from the servo driver 200Y corresponding thereto.

The model creation module 150X creates an internal model (for the X axis) of the control target (the mechanical system (for the X axis)) on the basis of the acquired servo parameter (for the X axis). In addition, the model creation module 150X supplies an X-axis model coefficient and a model predictive control parameter which define the created internal model (for the X axis) to the model predictive control module 170X.

Likewise, the model creation module 150Y creates an internal model (for the Y axis) of the control target (the mechanical system (for the Y axis)) on the basis of the acquired servo parameter (for the Y axis). In addition, the model creation module 150Y supplies a Y-axis model coefficient and a model predictive control parameter which define the created internal model (for the Y axis) to the model predictive control module 170Y.

By setting the model coefficients and the model predictive control parameters for the model predictive control modules 170X and 170Y, the model predictive control can be executed with respect to each of the axes.

In the model predictive control for the X axis, the track generation module 180X generates time series data of target positions in accordance with a pre-designated target track, sequentially reads target positions X corresponding to control cycles from the time series data, and inputs the target positions to the model predictive control module 170X, as shown in FIG. 7. The model predictive control module 170X applies the target positions X from the track generation module 180X and an actual position X of the mechanical system (for the X axis) to the internal model (for the X axis) created beforehand, and thus calculates a corrected target position X. Then, the model predictive control module 170X supplies the calculated corrected target position X to the servo driver 200X (a model-following control unit 230X).

Likewise, in the model predictive control for the Y axis, the track generation module 180Y generates time series data of target positions in accordance with a pre-designated target track, sequentially reads target positions Y corresponding to the control cycles from the time series data, and inputs the target positions to the model predictive control module 170Y. The model predictive control module 170Y applies the target positions Y from the track generation module 180Y and an actual position Y of the mechanical system (for the Y axis) to the internal model (for the Y axis) created beforehand, and thus calculates a corrected target position Y. Then, the model predictive control module 170Y supplies the calculated corrected target position Y to the servo driver 200Y (a model-following control unit 230Y).

Also, similar to FIG. 3, the servo driver 200X includes difference calculation units 210X and 214X, a position control unit 212X, a speed control unit 216X, an adder 218X, a torque control unit 220X, a speed detection unit 222X, and a model-following control unit 230X, and the servo driver 200Y includes difference calculation units 210Y and 214Y, a position control unit 212Y, a speed control unit 216Y, an adder 218Y, a torque control unit 220Y, a speed detection unit 222Y, and a model-following control unit 230Y as a functional configuration.

The model predictive control by the control device 100 is realized with the above-described functional configuration.

F. Internal Model Creation Process

Next, the internal model creation process will be described in detail. Details of the process to be described below correspond to the processes of Steps S104 to S106 of FIG. 5 and the function of the model creation modules 150 shown in FIG. 6.

The control device 100 (specifically, the model creation modules 150) acquires servo parameters from the target servo drivers 200. When the control device 100 and the servo drivers 200 are connected for communication via the field bus 101, servo parameters may be acquired from the servo drivers 200 (the model-following control units 230) by a predetermined communication command being issued to the target servo drivers 200.

As the generated internal model of the control target, an appropriate transfer function may be employed focusing on a physical structure or the like of the target mechanical system. As an example, a model in which a primary delay filter is multiplied by a secondary delay system element, as shown in the following formula, may be employed as the internal model of the control target.

$$G(s) = \frac{\omega^2}{s^2 + 2 \cdot \zeta \cdot \omega \cdot s + \omega^2} \times \frac{1}{T \cdot s + 1} \qquad \text{[Expression 1]}$$

The above-mentioned internal model is a transfer function defined in a Laplace region (time-continuation). In an actual control arithmetic operation, the control device 100 repeats arithmetic processing in a predetermine control cycle, and thus a form of sampling may be used. When the above formula is time-discretized in the control cycle of the control device 100, the following transfer function G(z) can be derived.

$$G(z) = \frac{b0 \cdot z^3 + b1 \cdot z^2 + b2 \cdot z + b3}{z^3 + a1 \cdot z^2 + a2 \cdot z + a3} \qquad \text{[Expression 2]}$$

The transfer function derived above is used as the internal model of the control target. Note that the model predictive control modules 170 retain coefficients b0, b1, b2, b3, a1, a2, and a3 for defining the above-described transfer function.

Note that, when the control device 100 and the one or multiple servo drivers 200 are connected via the field bus 101 as shown in FIG. 1, a dead time occurs in communication performed via the field bus 101, and thus an internal model that considers such a dead time may be used.

Specifically, by setting a delay time of communication between the control device 100 and the one or multiple servo drivers 200 (normally, a communication cycle of the field bus) as d, the dead time is reflected in the above-described transfer function as a dead time element. The transfer function G(z) in which the dead time element is reflected is as follows.

$$G(z) = \frac{b0 \cdot z^3 + b1 \cdot z^2 + b2 \cdot z + b3}{z^3 + a1 \cdot z^2 + a2 \cdot z + a3} \times z^{-d} \qquad \text{[Expression 3]}$$

As described above, the control device 100 (specifically, the model predictive control modules 170) executes the model predictive control using the transfer function G(z) representing the internal model of the control target.

Note that, although the example in which the model predictive control is used with the created internal model of the control target is introduced in the present embodiment, for example, a motion simulation using the created internal model or the like may be executed in a personal computer.

G. Model Predictive Control

Next, the model predictive control will be described in detail. Details of the process to be described below correspond to the processes of Steps S108 to S114 of FIG. 5 and the functions of the model predictive control modules 170X and 170Y and the track generation modules 180X and 180Y shown in FIG. 7.

Figure 8:
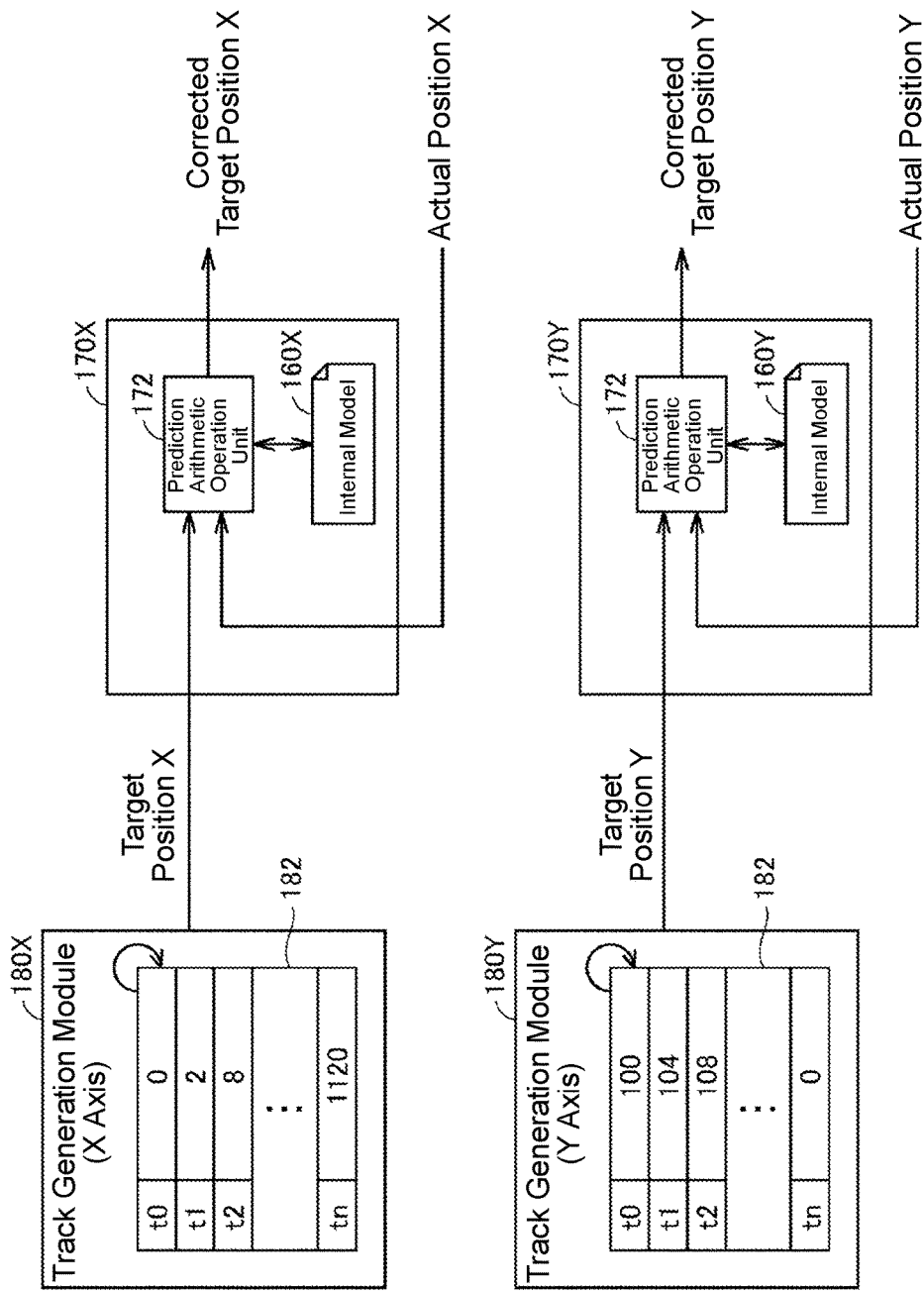
FIG. 8 is a schematic diagram showing a functional configuration applied when the model prediction control is executed in the control device according to the embodiment.

FIG. 8 is a schematic diagram showing a functional configuration applied when the model prediction control is executed in the control device 100 according to the present embodiment. Referring to FIG. 8, the control device 100 (specifically, the track generation modules 180X and 180Y) generates and holds time series data 182 of positions (target positions) to which a control target (a mechanical system (for the X axis) and the mechanical system (for the Y axis)) are to be moved. The time series data 182 of the target positions may be stored in array variables that are accessible by a program executed by the control device 100. The model predictive control modules 170X and 170Y access the time series data 182 of the target positions and acquires a target position of each control cycle (including a target position corresponding to a current control cycle and multiple target positions of a certain period of the current control cycle) with reference to the array variables or the like. The model predictive control modules 170X and 170Y include prediction arithmetic operation units 172. The prediction arithmetic operation units 172 calculate corrected target positions X and Y on the basis of the corresponding target positions and actual positions X and Y from the corresponding servo drivers 200X and 200Y through an application of internal models 160X and 160Y.

The corrected target position for each of the axes is calculated for each of the control cycles. Then, the corrected target positions obtained from the calculation are output to the corresponding servo drivers 200. The servo drivers 200 drive the servo motors 300 in accordance with the corrected target positions supplied from the control device 100, and thereby position control of the control target is realized.

As described above, the corrected target positions supplied to the servo drivers 200 are updated in each of the control cycles in accordance with the pre-designated target track.

H. Validation of Created Internal Model

The internal model created in the above-described procedure may be validated. Servo parameters stored in the servo drivers 200 may be considered as not being valid, for example, when tuning is not performed at all in the target servo drivers 200, when any physical change is made in the control target that undergoes tuning, when the control target that underwent tuning shows a secular change, or the like. As a result, it is possible that the internal model of the control target generated by the control device 100 is not valid. In such a case, the servo drivers 200 need to perform tuning again or the like. Validity of the internal model can be evaluated using the following procedure.

(h1: Stage Before Execution of Model Predictive Control)

First, a validation method of the internal model before the model predictive control is executed will be described. That is, validity of the created internal model may be determined at a time at which the internal model is generated.

Specifically, first, a test pattern such as a sine wave is supplied to the servo drivers 200 as a target position, and an actual position yi at that time is measured without the model predictive control being performed. In addition, an output value ymi of the internal model is calculated by supplying the same test pattern to the created internal model. Then, when a gap between the measured actual position yi and the calculated output value ymi is significant, it may be determined that the created internal model is not valid.

As a method for evaluating such a gap, an average value of sum of squares of deviations of time series data of both values may be used. For example, when an average value of sum of squares of deviations, which will be described below, is a predetermined threshold value or more, it may be determined that the created internal model is not valid.

$$\text{Average value of sum of squares of deviations} = \frac{1}{N} \cdot \sum_{j=1}^{i=N} (y_i - ym_t)^2$$

[Expression 4]

Any function may be used as a method for evaluating a gap of time series data of both values.

(h2: Operation During Execution of Model Predictive Control)

Next, validity of the created internal model may be monitored during execution of the model predictive control. As an example of such a validity monitoring method, for example, a gap between the corrected target position calculated in accordance with the model predictive control and an initial target position output from the track generation modules may be evaluated. More specifically, whether an absolute value of a difference between a corrected target position calculated in accordance with the model predictive control and the initial target position output from the track generation modules is greater than or equal to a pre-determined threshold value may be determined in each control cycle or through a predetermined number of control cycles.

As another monitoring method, a size of a temporal change of the calculated corrected target position may be evaluated. For example, whether an amount of a change between a corrected target position calculated in an immediately previous control cycle and a corrected target position calculated in a current control cycle is greater than or equal to a pre-determined threshold value may be determined. Alternatively, variations between corrected target positions and the corrected target position calculated in the current control cycle or the like may be evaluated.

I. Modified Example

Although the servo drivers 200 configured with the control loops of the model-following control system has been exemplified in the above-described embodiment, control loops other than the above-mentioned control loops are also applicable to the internal model creation process according to the embodiment. In the following modified example, a configuration in which servo drivers configured with control loops of a simple adaptive control system are used will be described as a part of another configuration included in the technical scope of the invention. That is, a control arithmetic operation in accordance with the control loops of the simple adaptive control system is executed in the servo drivers according to the modified example of the embodiment.

Figure 9:
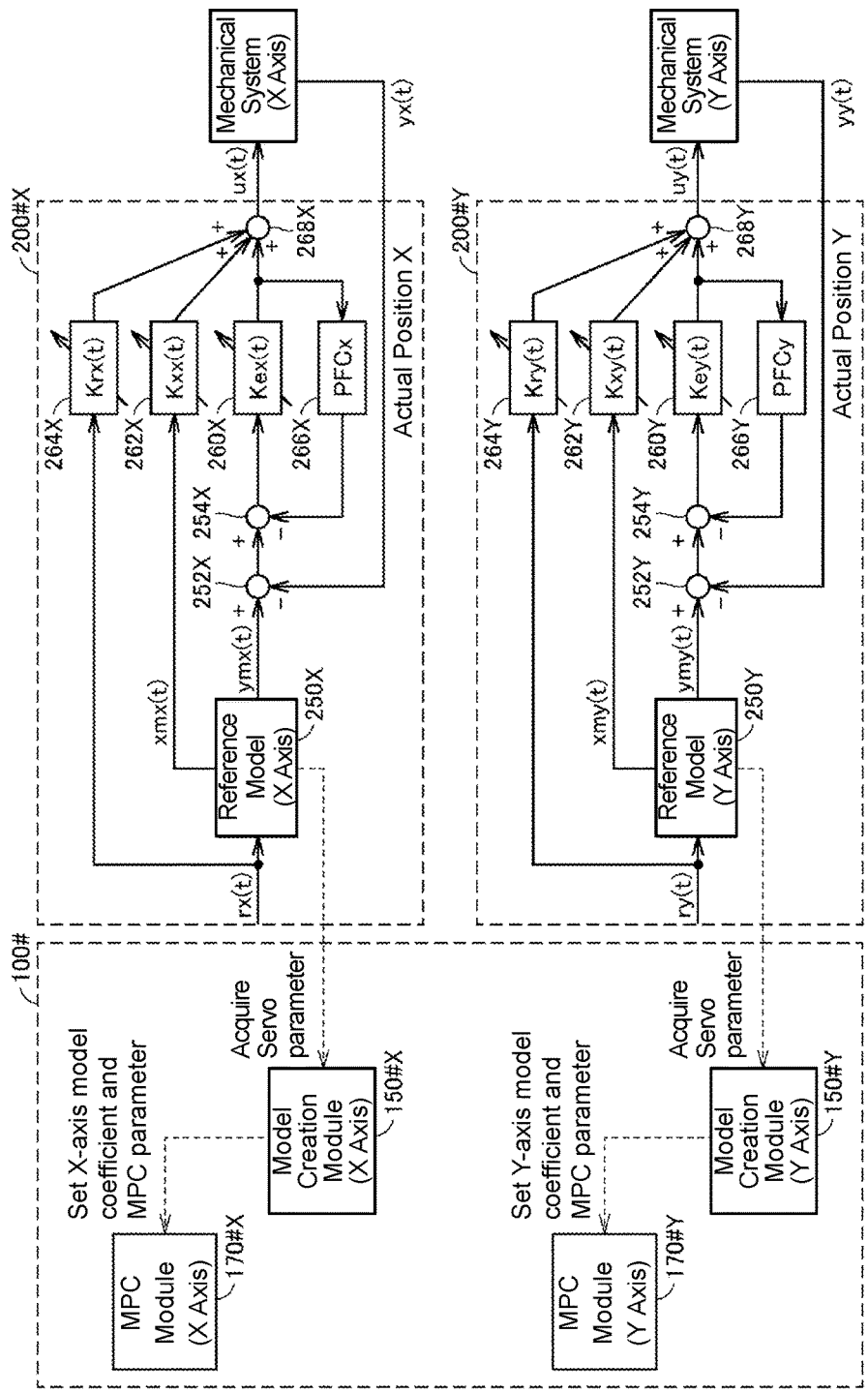
FIG. 9 is a schematic diagram showing a functional configuration applied when an internal model of a control target is created by a control device according to a modified example of the embodiment.
Figure 10:
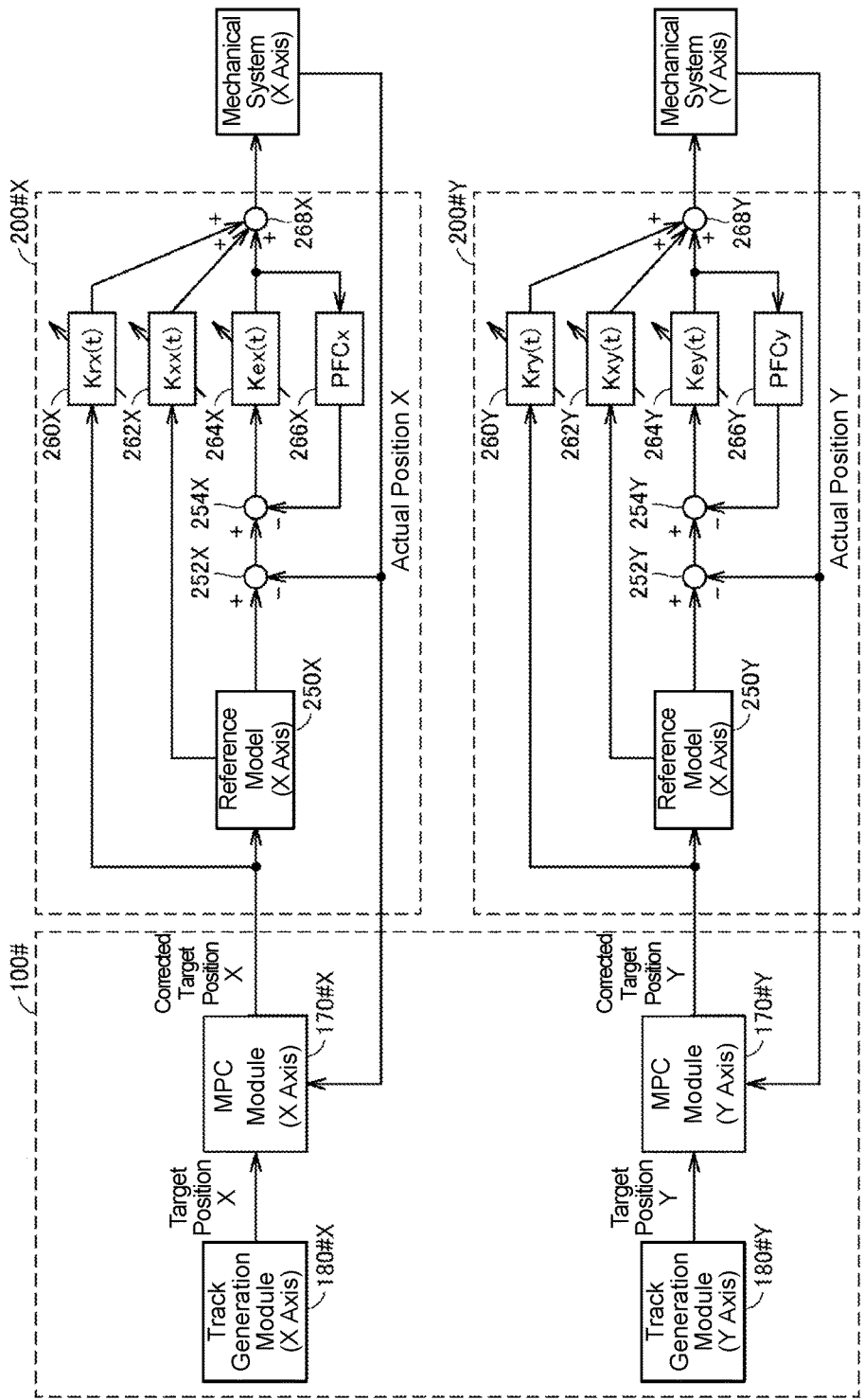
FIG. 10 is a schematic diagram showing a functional configuration applied when model predictive control using the internal model of the control target is executed by the control device according to the modified example of the embodiment.

FIG. 9 is a schematic diagram showing a functional configuration applied when an internal model 160 of a control target is created by a control device 100# according to the modified example of the embodiment. FIG. 10 is a schematic diagram showing a functional configuration applied when model predictive control using the internal model 160 of the control target is executed by the control device 100# according to the modified example of the embodiment.

Referring to FIG. 9 and FIG. 10, the control device 100# includes model creation modules 150#X and 150#Y, predictive control modules 170#X and 170#Y as a functional configuration. Servo drivers 200#X and 200#Y include reference models 250X and 250Y, difference calculation units 252X, 252Y, 254X, and 254Y, adaptive control gains (Ke(t), Kx(t), and Kr(t)) 260x, 260Yx, 262X, 262Y, 264X, and 264Y, feedforward compensators (PFC) 266X and 266Y, and adders 268X and 268Y as control loops of the simple adaptive control system. In FIG. 9 and FIG. 10, "x" or "y" is added to each coefficient of the adaptive control gains to indicate the X axis and the Y axis.

In the reference models 250X and 250Y constituting the simple adaptive control system shown in FIG. 9 and FIG. 10, two state values xm(t) and ym(t) can be defined as follows.

$$xm(t) = Am \cdot \dot{xm}(t) + bm(t) \cdot r(t)$$

$$ym(t) = cm^T xm(t)$$

[Expression 5]

Note that r(t) denotes a target value input to the reference model.

When the above-described reference models are employed, a manipulation amount u(t) output from the simple adaptive control system is as follows.

$$u(t)=Ke(t) \cdot ym(t)+Kx(t) \cdot xm(t)+Kr(t) \cdot r(t)$$

In addition, the adaptive control gain can be determined using a control amount y(t) from the control target and the output ym(t) of the reference models in accordance with an adjustment rule for a deviation e(t)(=y(t)−ym(t)) of both sides as described below.

$$\begin{bmatrix} K_e(t) \\ K_x(t) \\ K_r(t) \end{bmatrix} = \begin{bmatrix} \gamma_1 & 0 & 0 \\ 0 & \gamma_2 & 0 \\ 0 & 0 & \gamma_3 \end{bmatrix} \begin{bmatrix} e(t) \\ xm(t) \\ ym(t) \end{bmatrix} e(t) \quad \text{[Expression 6]}$$

Here, a transfer function G(s)=K/(s+a) of the reference models and a transfer function Gf(s)=δ/(s+α) of the feedforward compensator are set.

As described above, in tuning of the servo drivers 200, each piece of the adaptive control gain is determined in accordance with the above-described adjustment rule. The control device 100# acquires parameters of the reference models.

The control device 100# creates an internal model corresponding to the control loops of the above-described simple adaptive control system. Processes performed after the internal model is created are similar to those of the above-described embodiment. That is, as shown in FIG. 10, in a model predictive control for the X axis, a track generation module 180#X sequentially reads out target positions X corresponding to respective control cycles from time series data and inputs the target positions to a model predictive control module 170#X. The model predictive control module 170#X calculates a position deviation for the X axis from a difference between the target positions X from the track generation module 180#X and an actual position X of a mechanical system (for the X axis), and uses the previously created internal model (for the X axis) to calculate a corrected target position X. Then, the model predictive control module 170#X supplies the calculated corrected target position X to the servo driver 200#X.

Likewise, in the model predictive control for the Y axis, a track generation module 180#Y sequentially reads target positions Y corresponding to respective control cycles from the time series data and inputs the target positions to a model predictive control module 170#Y. The model predictive control module 170#Y calculates a position deviation for the Y axis from a difference between the target positions Y from the track generation module 180#Y and an actual position Y of the mechanical system (for the Y axis), and uses the previously created internal model (for the Y axis) to calculate a corrected target position Y. Then, the model predictive control module 170#Y supplies the calculated corrected target position Y to the servo driver 200#Y.

As described above, the internal model representing motion characteristics of the control target can be easily constructed through the technique of the modified example even when the servo drivers are configured with any type of control loop as long as the servo drivers have control parameters in which the motion characteristics of the control target are reflected, and the model predictive control can be easily implemented on the basis of the constructed model.

J. Conclusion

When the control device connected to the servo drivers are set to execute model-based control such as the model predictive control, it is necessary to create the internal model of the control target in advance. Knowledge and experience of a certain level are necessary for creating such an internal model, and thus this is not a control technique available for everyone.

On the other hand, according to the embodiments, the internal model representing motion characteristics of the control target for the control device 100 can be easily created by using the servo drivers that decide control parameters in accordance with the control target through tuning and allowing the control device 100 to use internal models (i.e., servo parameters) set inside the servo drivers.

Even a user who has no knowledge and experience of internal model creation can easily use the model-based control such as the model predictive control by using the above-described internal model creation function.

It should be understood that all aspects of the embodiments disclosed above are merely examples and do not limit the invention. The scope of the invention is indicated not by the above description but by the claims, and includes all types of modification made with intentions equivalent to those of the claims within the scope thereof.

What is claimed is:

1. A control device that controls a control target comprising a servo motor by supplying a target value to a servo driver which is configured to drive the servo motor and execute a control arithmetic operation in which a manipulation amount for driving the servo motor is determined on the basis of a control parameter determined in accordance with the control target, the control device comprising:
    an interface, exchanging data with the servo driver;
    a processor, acquiring the control parameter of the servo driver and creating an internal model representing a motion characteristic of the control target on the basis of the acquired control parameter of the servo driver, and
    calculating a corrected target value to be supplied to the servo driver on the basis of a target value corresponding to a target track and a feedback value corresponding to an actual position from the control target by applying the target value and the feedback value to the created internal model.

2. The control device according to claim 1, wherein the processor calculates the corrected target value in accordance with model predictive control.

3. The control device according to claim 1,
    wherein the control device is connected to multiple servo drivers, and
    wherein the processor is configured to correspond to each of the multiple servo drivers.

4. The control device according to claim 2,
    wherein the control device is connected to multiple servo drivers, and
    wherein the processor is configured to correspond to each of the multiple servo drivers.

5. The control device according to claim 1,
    wherein the control device and the servo driver are connected for communication, and
    wherein the processor acquires the control parameter by issuing a predetermined communication command to the servo driver.

6. The control device according to claim 2,
    wherein the control device and the servo driver are connected for communication, and
    wherein the processor acquires the control parameter by issuing a predetermined communication command to the servo driver.

7. The control device according to claim 3,
wherein the control device and the servo driver are connected for communication, and
wherein the processor acquires the control parameter by issuing a predetermined communication command to the servo driver.

8. The control device according to claim 1,
wherein the control device comprises a processor that executes a user program, and
wherein the processor is functionalized by a function block prescribed in the user program.

9. The control device according to claim 2,
wherein the control device comprises a processor that executes a user program, and
wherein the processor is functionalized by a function block prescribed in the user program.

10. The control device according to claim 3,
wherein the control device comprises a processor that executes a user program, and
wherein the processor is functionalized by a function block prescribed in the user program.

11. The control device according to claim 1, further comprising:
a memory, storing time series data of a target value that defines the target track.

12. The control device according to claim 3, further comprising:
a memory, storing time series data of a target value that defines the target track.

13. The control device according to claim 1, wherein the servo driver executes the control arithmetic operation in accordance with a control loop of a model-following control system.

14. The control device according to claim 2, wherein the servo driver executes the control arithmetic operation in accordance with a control loop of a model-following control system.

15. The control device according to claim 3, wherein the servo driver executes the control arithmetic operation in accordance with a control loop of a model-following control system.

16. The control device according to claim 1, wherein the servo driver executes the control arithmetic operation in accordance with a control loop of a simple adaptive control system.

17. The control device according to claim 2, wherein the servo driver executes the control arithmetic operation in accordance with a control loop of a simple adaptive control system.

18. The control device according to claim 3, wherein the servo driver executes the control arithmetic operation in accordance with a control loop of a simple adaptive control system.

19. A non-statutory storage medium storing a control program executable by a control device that controls a control target comprising a servo motor by supplying a target value to a servo driver which is configured to drive the servo motor and execute a control arithmetic operation in which a manipulation amount for driving the servo motor is determined on the basis of a control parameter determined in accordance with the control target, the control program causing the control device to execute:
a step of acquiring the control parameter of the servo driver;
a step of creating an internal model representing a motion characteristic of the control target on the basis of the acquired control parameter of the servo driver;
a step of acquiring a target value corresponding to a target track; and
a step of calculating a corrected target value to be supplied to the servo driver on the basis of a feedback value corresponding to an actual position from the control target by applying the target value and the feedback value to the created internal model.

20. A control system comprising:
a servo driver, configured to drive a servo motor; and
a control device, configured to control a control target comprising the servo motor by supplying a target value to the servo driver,
wherein the servo driver is configured to execute a control arithmetic operation in which a manipulation amount for driving the servo motor is determined on the basis of a control parameter determined in accordance with the control target, and
wherein the control device comprises:
an interface, exchanging data with the servo driver;
a processor, acquiring the control parameter of the servo driver and creating an internal model representing a motion characteristic of the control target, and
calculating a corrected target value to be supplied to the servo driver on the basis of a target value corresponding to a target track and a feedback value corresponding to an actual position from the control target by applying the target value and the feedback value to the created internal model.

* * * * *